(12) United States Patent  
Bengio et al.

(10) Patent No.: US 9,372,920 B2  
(45) Date of Patent: *Jun. 21, 2016

(54) IDENTIFYING TEXTUAL TERMS IN RESPONSE TO A VISUAL QUERY

(71) Applicant: Google Inc., Mountain View, CA (US)

(72) Inventors: Samy Bengio, Los Altos, CA (US); David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/596,081

(22) Filed: Jan. 13, 2015

(65) Prior Publication Data

US 2015/0193528 A1   Jul. 9, 2015

Related U.S. Application Data

(63) Continuation of application No. 13/570,162, filed on Aug. 8, 2012, now Pat. No. 8,935,246.

(51) Int. Cl.
*G06F 7/00* (2006.01)
*G06F 17/30* (2006.01)

(52) U.S. Cl.
CPC .... *G06F 17/30696* (2013.01); *G06F 17/30268* (2013.01); *G06F 17/30277* (2013.01); *G06F 17/30663* (2013.01)

(58) Field of Classification Search
None
See application file for complete search history.

(56) References Cited

U.S. PATENT DOCUMENTS

| | | | |
|---|---|---|---|
| 5,615,384 A | 3/1997 | Allard et al. | |
| 5,724,571 A | 3/1998 | Woods | |
| 5,764,799 A | 6/1998 | Hong et al. | |
| 5,983,237 A | 11/1999 | Jain et al. | |
| 6,137,907 A | 10/2000 | Clark et al. | |
| 6,182,063 B1 | 1/2001 | Woods | |
| 6,363,179 B1 | 3/2002 | Evans et al. | |
| 6,408,293 B1 | 6/2002 | Aggarwal et al. | |

(Continued)

FOREIGN PATENT DOCUMENTS

| | | |
|---|---|---|
| CN | 101375281 | 2/2009 |
| DE | 10245900 | 4/2004 |

(Continued)

OTHER PUBLICATIONS

Anagnostopoulos, Information fosion meta-search interface for precise photo acquisition on the web, 25th Int. Conf. Information Technology Interfaces 1TI 2003, Jun. 16-19, 2003, pp. 375-381.

(Continued)

*Primary Examiner* — Robert Beausoliel, Jr.
*Assistant Examiner* — Michael Pham
(74) *Attorney, Agent, or Firm* — Fish & Richardson P.C.

(57) ABSTRACT

A method, system, and computer readable storage medium is provided for identifying textual terms in response to a visual query is provided. A server system receives a visual query from a client system. The visual query is responded to as follows. A set of image feature values for the visual query is generated. The set of image feature values is mapped to a plurality of textual terms, including a weight for each of the textual terms in the plurality of textual terms. The textual terms are ranked in accordance with the weights of the textual terms. Then, in accordance with the ranking the textual terms, one or more of the ranked textual terms are sent to the client system.

20 Claims, 12 Drawing Sheets

(56) References Cited

U.S. PATENT DOCUMENTS

| | | | |
|---|---|---|---|
| 6,594,658 | B2 | 7/2003 | Woods |
| 7,113,944 | B2 | 9/2006 | Zhang et al. |
| 7,421,155 | B2 | 9/2008 | King et al. |
| 7,668,405 | B2 | 2/2010 | Gallagher |
| 7,698,332 | B2 * | 4/2010 | Liu .................. G06F 17/30265 707/728 |
| 7,917,514 | B2 | 3/2011 | Lawler et al. |
| 7,934,156 | B2 | 4/2011 | Forstall et al. |
| 8,452,794 | B2 | 5/2013 | Yang et al. |
| 8,489,589 | B2 | 7/2013 | Mei et al. |
| 8,935,246 | B2 | 1/2015 | Bengio et al. |
| 2003/0065779 | A1 | 4/2003 | Malik et al. |
| 2005/0083413 | A1 | 4/2005 | Reed et al. |
| 2005/0086224 | A1 | 4/2005 | Franciosa et al. |
| 2005/0097131 | A1 | 5/2005 | Benco et al. |
| 2005/0162523 | A1 | 7/2005 | Darrell et al. |
| 2006/0020630 | A1 | 1/2006 | Stager et al. |
| 2006/0041543 | A1 | 2/2006 | Achlioptas |
| 2006/0048059 | A1 | 3/2006 | Etkin |
| 2006/0085477 | A1 | 4/2006 | Phillips et al. |
| 2006/0150119 | A1 | 7/2006 | Chesnais et al. |
| 2006/0193502 | A1 | 8/2006 | Yamaguchi |
| 2006/0253491 | A1 | 11/2006 | Gokturk et al. |
| 2007/0011149 | A1 | 1/2007 | Walker |
| 2007/0086669 | A1 | 4/2007 | Berger et al. |
| 2007/0106721 | A1 | 5/2007 | Schlater |
| 2007/0143312 | A1 | 6/2007 | Wiseman |
| 2007/0201749 | A1 | 8/2007 | Yamauchi et al. |
| 2007/0245245 | A1 | 10/2007 | Blue et al. |
| 2007/0268392 | A1 | 11/2007 | Paalasmaa et al. |
| 2008/0031506 | A1 | 2/2008 | Agatheeswaran et al. |
| 2008/0080745 | A1 | 4/2008 | Vanhoucke et al. |
| 2008/0226119 | A1 | 9/2008 | Candelore et al. |
| 2008/0267504 | A1 | 10/2008 | Schloter et al. |
| 2008/0317339 | A1 | 12/2008 | Steinberg et al. |
| 2009/0031244 | A1 | 1/2009 | Brezina et al. |
| 2009/0060289 | A1 | 3/2009 | Shah et al. |
| 2009/0097748 | A1 | 4/2009 | Lee et al. |
| 2009/0100048 | A1 | 4/2009 | Hull et al. |
| 2009/0129571 | A1 | 5/2009 | Altberg et al. |
| 2009/0237546 | A1 | 9/2009 | Bloebaum et al. |
| 2009/0254539 | A1 | 10/2009 | Wen et al. |
| 2010/0046842 | A1 | 2/2010 | Conwell |
| 2010/0169770 | A1 | 7/2010 | Hong et al. |
| 2010/0205202 | A1 | 8/2010 | Yang et al. |
| 2011/0035406 | A1 | 2/2011 | Petrou et al. |
| 2011/0047163 | A1 * | 2/2011 | Chechik et al. ............... 707/741 |
| 2011/0085057 | A1 | 4/2011 | Takahashi |
| 2011/0129153 | A1 * | 6/2011 | Petrou .............. G06F 17/30244 382/182 |
| 2011/0131235 | A1 | 6/2011 | Petrou et al. |
| 2011/0282906 | A1 | 11/2011 | Wong |
| 2012/0093371 | A1 | 4/2012 | Li et al. |
| 2012/0134590 | A1 | 5/2012 | Petrou et al. |

FOREIGN PATENT DOCUMENTS

| | | |
|---|---|---|
| EP | 0942387 | 9/1999 |
| EP | 1769019 | 6/2007 |
| KR | 10-2009-0073294 | 7/2009 |
| WO | 00/49526 | 8/2000 |
| WO | 02/17166 | 2/2002 |
| WO | 02/42864 | 5/2002 |
| WO | 2005/114476 | 12/2005 |
| WO | 2006/070047 | 7/2006 |
| WO | 2006/137667 | 12/2006 |
| WO | 2008/097051 | 8/2008 |
| WO | 2011/017557 | 2/2011 |

OTHER PUBLICATIONS

Anonymous, GPS Enabled Dating??, Nov. 30, 2006, 21 pgs.
Anonymous, Wic erstelie ich bei StudiVZ eine Bilder-Verlinkung? (How do I create an image with StudiVZ-linkng?), Aug. 20, 2008, 5 pgs.
Castro, iPhoto's new Faces feature really does work!, www.pigsgourdsandvvikis.com, Feb. 17, 2009, 8pgs.
Frucci, Half-Amazing, Half-Terrifying Concept App Combines Facial Recognition with Augmented Reality, Jul. 22, 2009, 2 pgs.
Google Inc., International Search Report and Written Opinion, PCT/US2010/044603, Nov. 17, 2010, 11 pgs.
Google Inc., International Search Report and Written Opinion, PCT/US2010/044604, Oct. 6, 2010, 10 pgs.
Google Inc., International Search Report and Written Opinion, PCT/US2010/044771, Dec. 16, 2010, 13 pgs.
Google Inc., International Search Report and Written Opinion, PCT/US2010/044885, Oct. 20, 2010, 7 pgs.
Google Inc., International Search Report and Written Opinion, PCT/US2010/045009, Nov. 17, 2010, 7 pgs.
Google Inc., International Search Report and Written Opinion, PCT/US2010/045316, Dec. 7, 2010, 6 pgs.
Google Inc., International Search Report and Written Opinion, PCT/US2010/045631, Sep. 5, 2011, 12 pgs.
Google Inc., International Search Report and Written Opinion, PCT/US2011/062930, May 2, 2012, 10 pgs.
Google Inc., Notice of Acceptance, AU 2010279333, Feb. 8, 2013, 3 pgs.
Google Inc., Office Action, AU 2010279248, Oct. 4, 2012, 3 pgs.
Google Inc., Office Action, AU 2010279248, Feb. 5, 2013, 3 pgs.
Google Inc., Office Action, AU 2010279334, Jan. 31, 2013, 3 pgs.
Google Inc., Office Action, AU 2010326655, Nov. 23, 2012, 3 pgs.
Google Inc., Office Action, Australian Patent Application No. 2010279333, Jul. 19, 2012, 3 pgs.
Google Inc., Office Action, Australian Patent Application No. 2010279334, Jul. 24, 2012, 3 pgs.
Google Inc., Office Action, Australian Patent Application No. 2010326654, Aug. 22, 2012, 3 pgs.
Google Inc., Office Action, CN 201080045164.6, Feb. 8, 2013, 15 pgs.
Google Inc., Office Action, EP 10742974.8, Dec. 3, 2012, 7 pgs.
International Search Report and Written Opinion in International Application No. PCT/US2013/053080, mailed Sep. 10, 2013, 11 pages.
Koskela et al., "Semantic Annotation of Image Groups with Self-organizing Maps," Image and Video Retrieval, Lecture Notes in Computer Science, 3568:518-52, Aug. 4, 2005.
Petr Ou, Office Action, U.S. Appl. No. 12/852,189, Sep. 13, 2012, 9 pgs.
Petrou, Office Action U.S. Appl. No. 12/853,878, Feb. 1, 2012, 26 pgs.
Petrou, Office Action, U.S. Appl. No. 12/850,483, Mar. 9, 2012, 9 pgs.
Petrou, Office Action, U.S. Appl. No. 12/850,513, Mar. 29, 2012, 13 pgs.
Petrou, Office Action, U.S. Appl. No. 12/851,473 Sep. 11, 2012, 33 pgs.
Petrou, Office Action, U.S. Appl. No. 12/853,878, Jun. 13, 2012, 41 pgs.
Petrou, Office Action, U.S. Appl. No. 12/854,793, Feb. 17, 2012, 31 pgs.
Petrou, Office Action, U.S. Appl. No. 12/854,793, Jun. 13, 2012, 33 pgs.
Petrou, Office Action, U.S. Appl. No. 12/855,563, Oct. 5, 2012, 22 pgs.
Petrou, Office Action, U.S. Appl. No. 12/850,483, Mar. 26, 2013, 11 pgs.
Petrou, Office Action, U.S. Appl. No. 12/850,513, Jan. 25, 2013, 22 pgs.
Petrou, Office Action, U.S. Appl. No. 12/851,473, Mar. 29, 2013, 34 pgs.
Petrou, Office Action, U.S. Appl. No. 12/852,189, Apr. 1, 2013, 11 pgs.
Petrou, Office Action, U.S. 12/853,188, May 8, 2013, 21 pgs.
Stone, Autotagging Facebook: Social Network Context Improves Photo Annotation, Feb. 17, 2009, 8 pgs.
International Preliminary Report on Patentability in International Application No. PCT/US2013/053080, mailed Feb. 19, 2015, 7 pages.

* cited by examiner

IDENTIFYING TEXTUAL TERMS IN RESPONSE TO A VISUAL QUERY

This application is a continuation of U.S. patent application Ser. No. 13/570,162, filed Aug. 8, 2012, now U.S. Pat. No. 8,935,246, the entire contents of which are incorporated by reference herein. This application is potentially related to the following U.S. Patent Application and Provisional Patent Application, which are incorporated by reference herein in their entirety: U.S. Provisional Patent Application No. 61/266,116, filed Dec. 2, 2009, entitled "Architecture for Responding to a Visual Query," and U.S. patent application Ser. No. 12/850,483, filed Aug. 4, 2010.

TECHNICAL FIELD

The disclosed embodiments relate generally to the field of image processing, and in particular to determining one or more textual terms in response to a visual query.

BACKGROUND

Text-based or term-based based searching, wherein a user inputs a word or phrase into a search engine and receives a variety of results is a useful tool for searching. Term based queries require a user to explicitly provide search terms in the form of words, phrases and/or other terms. Sometimes a user may see an object in the physical world and want to locate information related to the object, but do know what terms to use for a term-based query in a search engine. Accordingly, a system that can receive a visual query such as an image, and use it to determine one or more terms would be desirable.

SUMMARY

According to some embodiments, a method is performed on a server system having one or more processors and memory storing one or more programs for execution by the one or more processors. In the method, the server system receives a visual query from a client system. The server system responds to the visual query by: generating a set of image feature values for the visual query; mapping the set of image feature values to a plurality of textual terms, including a weight for each of the textual terms in the plurality of textual terms; ranking the textual terms in accordance with the weights of the textual terms; and in accordance with the ranking the textual terms, sending one or more of the ranked textual terms to the client system.

A server system includes one or more processors and memory storing one or more programs for execution by the one or more processors. The one or more programs include instructions for receiving a visual query from a client system, and responding to the visual query by: generating a set of image feature values for the visual query; mapping the set of image feature values to a plurality of textual terms, including a weight for each of the textual terms in the plurality of textual terms; ranking the textual terms in accordance with the weights of the textual terms; and in accordance with the ranking the textual terms, sending one or more of the ranked textual terms to the client system.

A non-transitory computer readable storage medium stores one or more programs configured for execution by a computer, such as a server system having one or more processors for executing programs. The one or more programs include instructions for receiving a visual query from a client system, and responding to the visual query by: generating a set of image feature values for the visual query; mapping the set of image feature values to a plurality of textual terms, including a weight for each of the textual terms in the plurality of textual terms; ranking the textual terms in accordance with the weights of the textual terms; and in accordance with the ranking the textual terms, sending one or more of the ranked textual terms to the client system.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that various embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1:
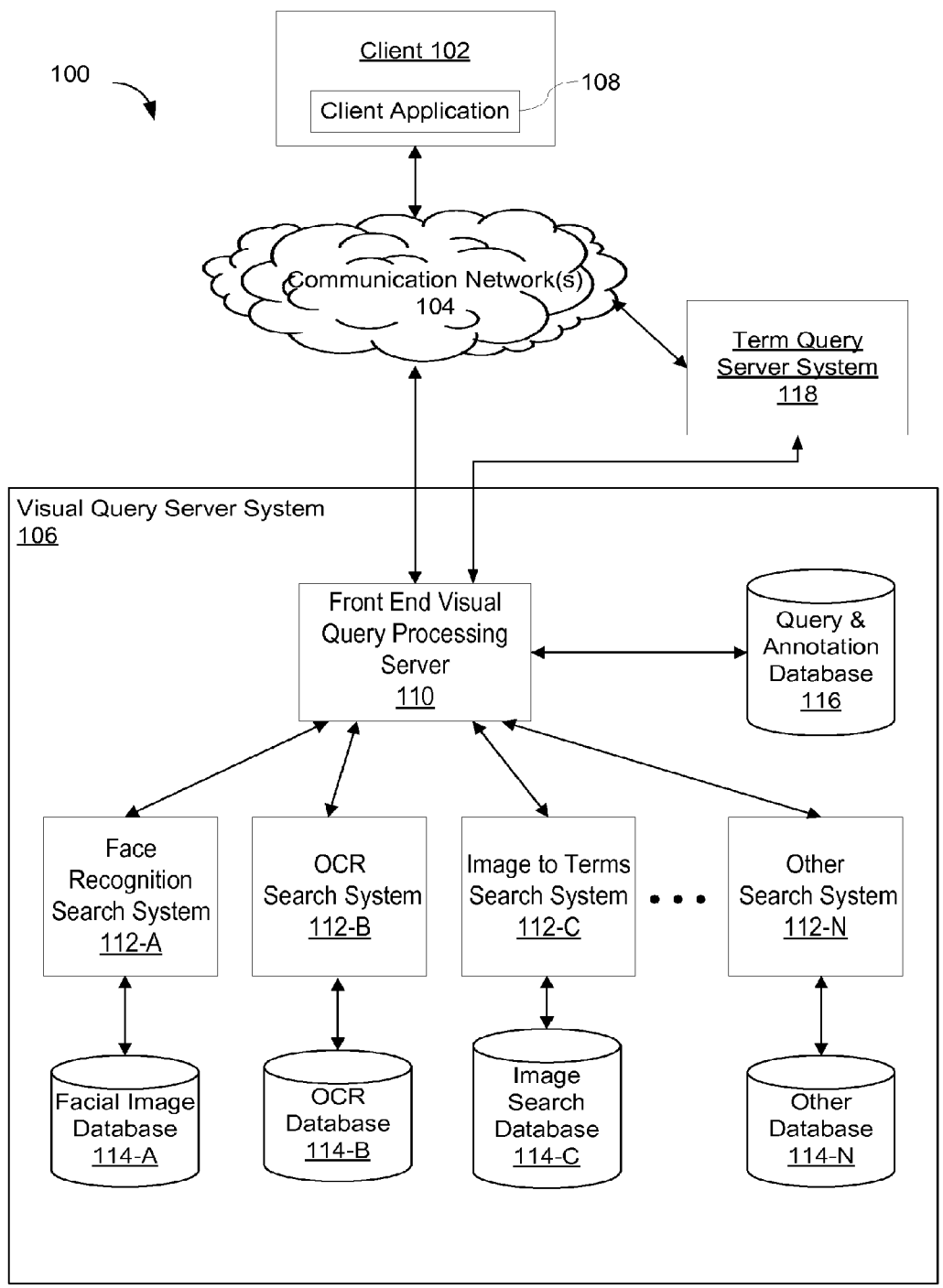
FIG. 1 is a block diagram illustrating a computer network that includes a visual query server system.

FIG. 1 is a block diagram illustrating a computer network that includes a visual query server system according to some embodiments. The computer network 100 includes one or more client systems 102 and a visual query server system 106. One or more communications networks 104 interconnect these components. The communications network 104 may be any of a variety of networks, including local area networks (LAN), wide area networks (WAN), wireless networks, wireline networks, the Internet, or a combination of such networks.

Figure 8:
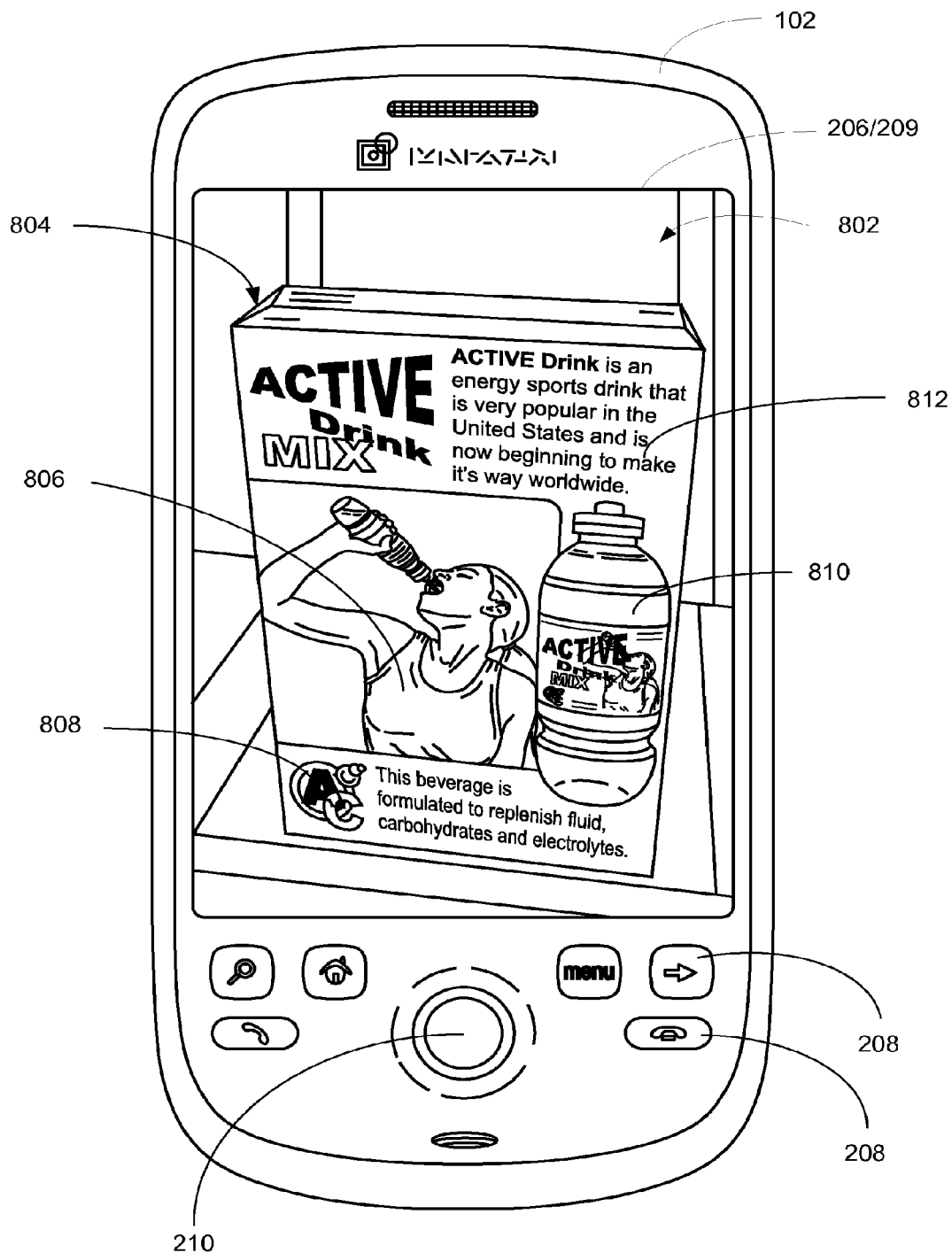
FIG. 8 illustrates a client system with a screen shot of an exemplary visual query, in accordance with some embodiments.

The client system 102 includes a client application 108, which is executed by the client system, for receiving a visual query (e.g., visual query 802 of FIG. 8). A visual query is an image that is submitted as a query to a search engine or search system. Examples of visual queries, without limitations include photographs, scanned documents and images, and drawings. In some embodiments, the client application 108 is selected from the set consisting of a search application, a search engine plug-in for a browser application, and a search engine extension for a browser application. In some embodiments, the client application 108 is an "omnivorous" search box, which allows a user to drag and drop any format of image into the search box to be used as the visual query.

A client system 102 sends queries to and receives data from the visual query server system 106. The client system 102 may be any computer or other device that is capable of communicating with the visual query server system 106. Examples include, without limitation, desktop and notebook computers, mainframe computers, server computers, mobile devices such as mobile phones and personal digital assistants, network terminals, and set-top boxes.

The visual query server system 106 includes a front end visual query processing server 110. The front end server 110 receives a visual query from the client 102, and sends the visual query to a plurality of parallel search systems 112 for simultaneous processing. The search systems 112 each implement a distinct visual query search process and access their corresponding databases 114 as necessary to process the visual query by their distinct search process. For example, a face recognition search system 112-A will access a facial image database 114-A to look for facial matches to the image query. If the visual query contains a face, the facial recognition search system 112-A will return one or more search results (e.g., names, matching faces, etc.) from the facial image database 114-A. In another example, the optical character recognition (OCR) search system 112-B, converts any recognizable text in the visual query into text for return as one or more search results. In the optical character recognition (OCR) search system 112-B, an OCR database 114-B may be accessed to recognize particular fonts or text patterns.

Any number of parallel search systems 112 may be used. Some examples include a facial recognition search system 112-A, an OCR search system 112-B, an image-to-terms search system 112-C (which may recognize an object or an object category), a product recognition search system (which may be configured to recognize 2-D images such as book covers and CDs and may also be configured to recognized 3-D images such as furniture), bar code recognition search system (which recognizes 1D and 2D style bar codes), a named entity recognition search system, landmark recognition (which may configured to recognize particular famous landmarks like the Eiffel Tower and may also be configured to recognize a corpus of specific images such as billboards), place recognition aided by geo-location information provided by a GPS receiver in the client system 102 or mobile phone network, a color recognition search system, and a similar image search system (which searches for and identifies images similar to a visual query). Further search systems can be added as additional parallel search systems, represented in FIG. 1 by system 112-N. All of the search systems, except the OCR search system, are collectively defined herein as search systems performing an image-match process. All of the search systems including the OCR search system are collectively referred to as query-by-image search systems. In some embodiments, the visual query server system 106 includes a facial recognition search system 112-A, an OCR search system 112-B, an image-to-terms search system 114-C, and at least one other query-by-image search system 112.

The parallel search systems 112 each individually process the visual search query and return their results to the front end server system 110. In some embodiments, the front end server 100 may perform one or more analyses on the search results such as one or more of: aggregating the results into a compound document, choosing a subset of results to display, and ranking the results as will be explained in more detail with regard to FIG. 3. The front end server 110 communicates the search results to the client system 102.

The client system 102 presents the one or more search results to the user. The results may be presented on a display, by an audio speaker, or any other means used to communicate information to a user. The user may interact with the search results in a variety of ways. In some embodiments, the user's selections, annotations, and other interactions with the search results are transmitted to the visual query server system 106 and recorded along with the visual query in a query and annotation database 116. Information in the query and annotation database can be used to improve visual query results. In some embodiments, the information from the query and annotation database 116 is periodically pushed to the parallel search systems 112, which incorporate any relevant portions of the information into their respective individual databases 114.

The computer network 100 optionally includes a term query server system 118, for performing searches in response to term queries. A term query is a query containing one or more terms, as opposed to a visual query which contains an image. The term query server system 118 may be used to generate search results that supplement information produced by the various search engines in the visual query server system 106. The results returned from the term query server system 118 may include any format. The term query server system 118 may include textual documents, images, video, etc. While term query server system 118 is shown as a separate system in FIG. 1, optionally the visual query server system 106 may include a term query server system 118.

Figure 7A:
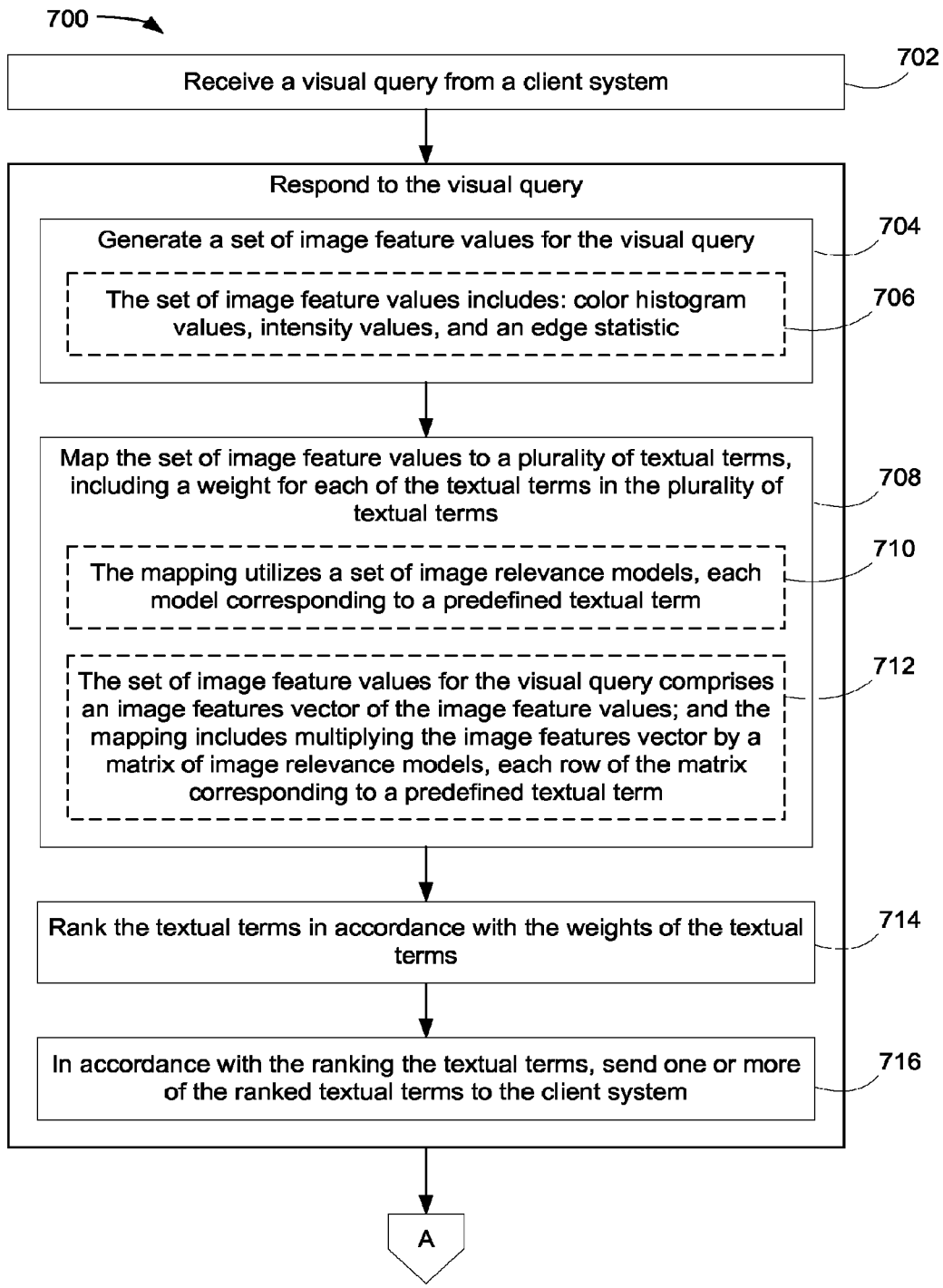
FIGS. 7A and 7B are flow diagrams illustrating a process for determining one or more textual terms in response to a visual query, in accordance with some embodiments.
Figure 7B:
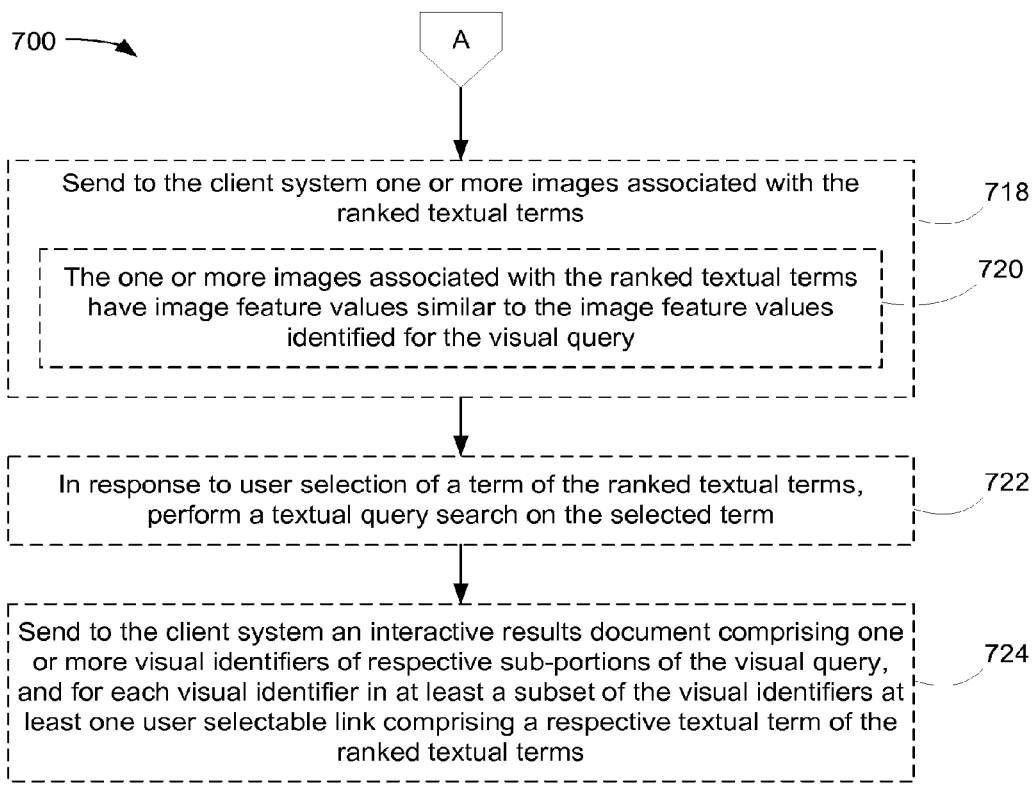

Additional information about the operation of the visual query server system 106 is provided below with respect to the flowcharts in FIGS. 5 and 7.

Figure 2:
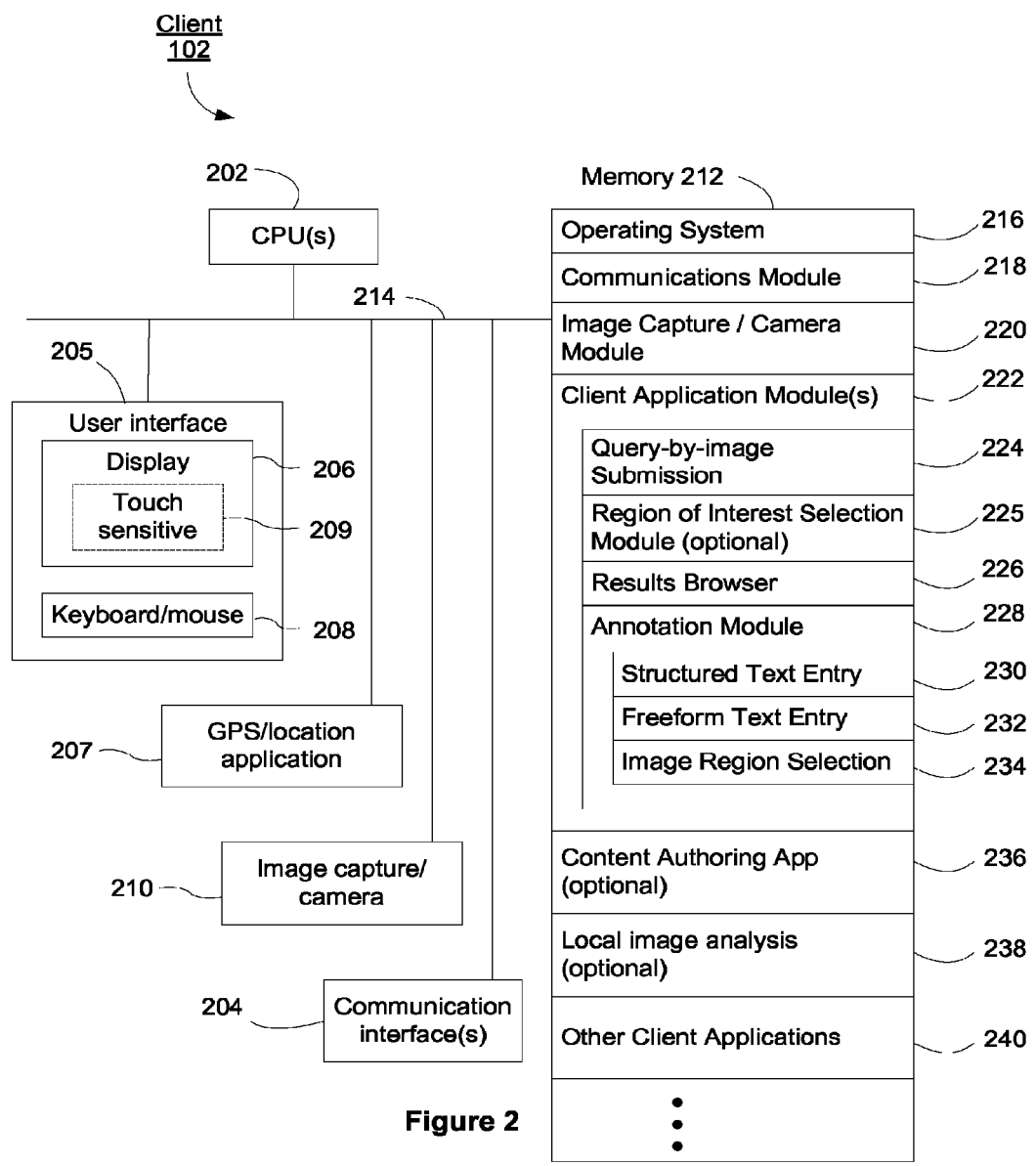
FIG. 2 is a block diagram illustrating a client system, in accordance with some embodiments.

FIG. 2 is a block diagram illustrating a client system 102 in accordance with some embodiments. The client system 102 typically includes one or more processing units (CPU's) 202, one or more network or other communications interfaces 204, memory 212, and one or more communication buses 214 for interconnecting these components. The communication buses 214 optionally include circuitry (sometimes called a chipset) that interconnects and controls communications between system components. The client system 102 includes a user interface 205. The user interface 205 includes a display device 206 and optionally includes an input means such as a keyboard, mouse, or other input buttons 208. Alternatively or in addition the display device 206 includes a touch sensitive surface 209, in which case the display 206/209 is a touch sensitive display. In client systems that have a touch sensitive display 206/209, a physical keyboard is optional (e.g., a soft keyboard may be displayed when keyboard entry is needed). Furthermore, some client systems use a microphone and voice recognition to supplement or replace the keyboard. Optionally, the client 102 includes a GPS (global positioning satellite) receiver, or other location detection apparatus 207 for determining the location of the client system 102. In some embodiments, visual query search services are provided that require the client system 102 to provide the visual query server system to receive location information indicating the location of the client system 102.

The client system 102 also includes an image capture device 210 such as a camera or scanner. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium. In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 204 (wired or wireless) and one or more communication networks, such as the Internet, other wide area networks, local area networks, metropolitan area networks, and so on;
- a image capture module 220 for processing a respective image captured by the image capture device/camera 210, where the respective image may be sent (e.g., by a client application module) as a visual query to the visual query server system;
- one or more client application modules 222 for handling various aspects of querying by image, including but not limited to: a query-by-image submission module 224 for submitting visual queries to the visual query server system; optionally a region of interest selection module 225 that detects a selection (such as a gesture on the touch sensitive display 206/209) of a region of interest in an image and prepares that region of interest as a visual query; a results browser 226 for displaying the results of the visual query; and optionally an annotation module 228 with optional modules for structured annotation text entry 230 such as filling in a form or for freeform annotation text entry 232, which can accept annotations from a variety of formats, and an image region selection module 234 (sometimes referred to herein as a result selection module) which allows a user to select a particular sub-portion of an image for annotation;
- an optional content authoring application(s) 236 that allow a user to author a visual query by creating or editing an image rather than just capturing one via the image capture device 210; optionally, one or such applications 236 may include instructions that enable a user to select a sub-portion of an image for use as a visual query;
- an optional local image analysis module 238 that pre-processes the visual query before sending it to the visual query server system. The local image analysis may recognize particular types of images, or sub-regions within an image. Examples of image types that may be recognized by such modules 238 include one or more of: facial type (facial image recognized within visual query), bar code type (bar code recognized within visual query), and text type (text recognized within visual query); and
- additional optional client applications 240 such as an email application, a phone application, a browser application, a mapping application, instant messaging application, social networking application etc. In some embodiments, the application corresponding to an appropriate actionable search result can be launched or accessed when the actionable search result is selected.

Optionally, the image region selection module 234 which allows a user to select a particular sub-portion of an image for annotation, also allows the user to choose a search result as a "correct" hit without necessarily further annotating it. For example, the user may be presented with a top N number of facial recognition matches and may choose the correct person from that results list. For some search queries, more than one type of result will be presented, and the user will choose a type of result. For example, the image query may include a person standing next to a tree, but only the results regarding the person is of interest to the user. Therefore, the image selection module 234 allows the user to indicate which type of image is the "correct" type—i.e., the type he is interested in receiving. The user may also wish to annotate the search result by adding personal comments or descriptive words using either the annotation text entry module 230 (for filling in a form) or freeform annotation text entry module 232.

In some embodiments, the optional local image analysis module 238 is a portion of the client application (108, FIG. 1). Furthermore, in some embodiments the optional local image analysis module 238 includes one or more programs to perform local image analysis to pre-process or categorize the visual query or a portion thereof. For example, the client application 222 may recognize that the image contains a bar code, a face, or text, prior to submitting the visual query to a search engine. In some embodiments, when the local image analysis module 238 detects that the visual query contains a particular type of image, the module asks the user if they are interested in a corresponding type of search result. For example, the local image analysis module 238 may detect a face based on its general characteristics (i.e., without determining which person's face) and provides immediate feedback to the user prior to sending the query on to the visual query server system. It may return a result like, "A face has been detected, are you interested in getting facial recognition matches for this face?" This may save time for the visual query server system (106, FIG. 1). For some visual queries, the front end visual query processing server (110, FIG. 1) only sends the visual query to the search system 112 corresponding to the type of image recognized by the local image analysis module 238. In other embodiments, the visual query to the search system 112 may send the visual query to all of the search systems 112A-N, but will rank results from the search system 112 corresponding to the type of image recognized by the local image analysis module 238. In some embodiments, the manner in which local image analysis impacts on operation of the visual query server system depends on the configuration of the client system, or configuration or processing parameters associated with either the user or the client system. Furthermore, the actual content of any particular visual query and the results produced by the local image analysis may cause different visual queries to be handled differently at either or both the client system and the visual query server system.

In some embodiments, bar code recognition is performed in two steps, with analysis of whether the visual query includes a bar code performed on the client system at the local image analysis module 238. Then the visual query is passed to a bar code search system only if the client determines the visual query is likely to include a bar code. In other embodiments, the bar code search system processes every visual query.

Figure 3:
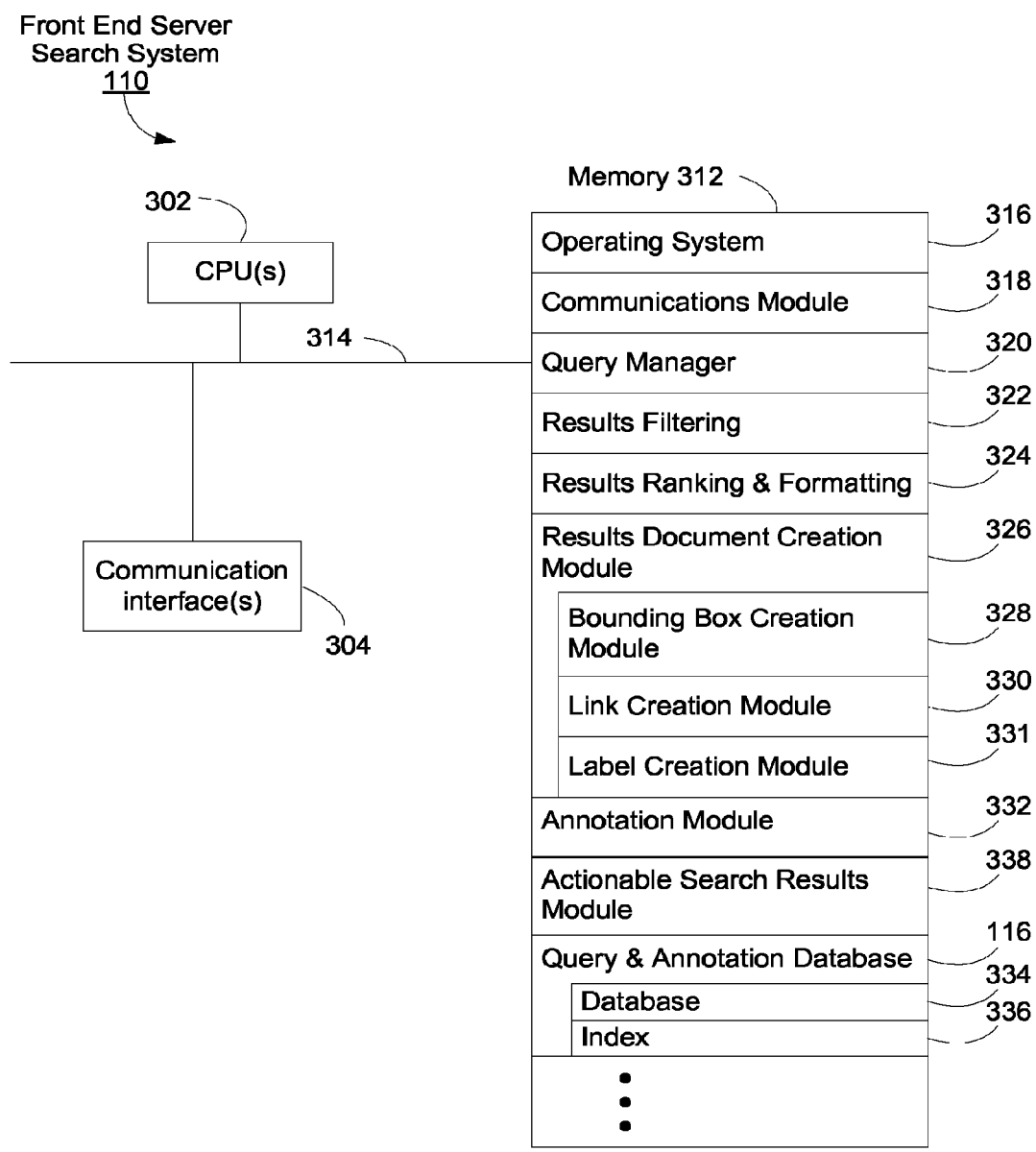
FIG. 3 is a block diagram illustrating a front end visual query processing server system, in accordance with some embodiments.

FIG. 3 is a block diagram illustrating a front end visual query processing server system 110 in accordance with some embodiments. The front end server 110 typically includes one or more processing units (CPU's) 302, one or more network or other communications interfaces 304, memory 312, and one or more communication buses 314 for interconnecting these components. The communication buses 314 optionally include circuitry (sometimes called a chipset) that interconnects and controls communications between system components. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302. Memory 312, or alternately the non-volatile memory device(s) within memory 312, comprises a non-transitory computer readable storage medium. In some embodiments, memory 312 or the computer readable storage medium of memory 312 stores the following programs, modules and data structures, or a subset thereof:

- an operating system 316 that includes procedures for handling various basic system services and for performing hardware dependent tasks;
- a network communication module 318 that is used for connecting the front end server system 110 to other computers via the one or more communication network interfaces 304 (wired or wireless) and one or more communication networks, such as the Internet, other wide area networks, local area networks, metropolitan area networks, and so on;
- a query manager 320 for handling the incoming visual queries from the client system 102 and sending them to two or more parallel search systems; as described elsewhere in this document, in some special situations a visual query may be directed to just one of the search systems, such as when the visual query includes an client-generated instruction (e.g., "facial recognition search only");
- a results filtering module 322 for optionally filtering the results from the one or more parallel search systems and sending the top or "relevant" results to the client system 102 for presentation;
- a results ranking and formatting module 324 for optionally ranking the results from the one or more parallel search systems and for formatting the results for presentation;
- a results document creation module 326, is used when appropriate, to create an interactive search results document; module 326 may include sub-modules, including but not limited to a bounding box creation module 328 and a link creation module 330;
- a label creation module 331 for creating labels that are visual identifiers of respective sub-portions of a visual query.
- an annotation module 332 for receiving annotations from a user and sending them to an annotation database 116;
- an actionable search results module 338 for generating, in response to a visual query, one or more actionable search result elements, each configured to launch a client-side action; examples of actionable search result elements are buttons to initiate a telephone call, to initiate email message, to map an address, to make a restaurant reservation, and to provide an option to purchase a product; and
- a query and annotation database 116 which comprises the database itself 334 and an index to the database 336.

The results ranking and formatting module 324 ranks the results returned from the one or more parallel search systems (112-A-112-N, FIG. 1). As already noted above, for some visual queries, only the results from one search system may be relevant. In such an instance, only the relevant search results from that one search system are ranked. For some visual queries, several types of search results may be relevant. In these instances, in some embodiments, the results ranking and formatting module 324 ranks all of the results from the search system having the most relevant result (e.g., the result with the highest relevance score) above the results for the less relevant search systems. In other embodiments, the results ranking and formatting module 324 ranks a top result from each relevant search system above the remaining results. In some embodiments, the results ranking and formatting module 324 ranks the results in accordance with a relevance score computed for each of the search results. For some visual queries, augmented textual queries are performed in addition to the searching on parallel visual search systems. In some embodiments, when textual queries are also performed, their results are presented in a manner visually distinctive from the visual search system results.

The results ranking and formatting module 324 also formats the results. In some embodiments, the results are presented in a list format. In some embodiments, the results are presented by means of an interactive results document. In some embodiments, both an interactive results document and a list of results are presented. In some embodiments, the type of query dictates how the results are presented. For example, if more than one searchable subject is detected in the visual query, then an interactive results document is produced, while if only one searchable subject is detected the results will be displayed in list format only.

The label creation module is used to create labels for one or more images in the visual query. In some embodiments, when one or more textual terms are determined to correspond to one or more images in a visual query, the label creation module 331 uses the terms to label the image(s) in the visual query. In some embodiments, when the user clicks on the label, a term based query is launched for the term. In other embodiments, the labels are links to the results for a term based query associated with labeled term. In these embodiments, the labels are part of an interactive results document explained below.

Figure 11:
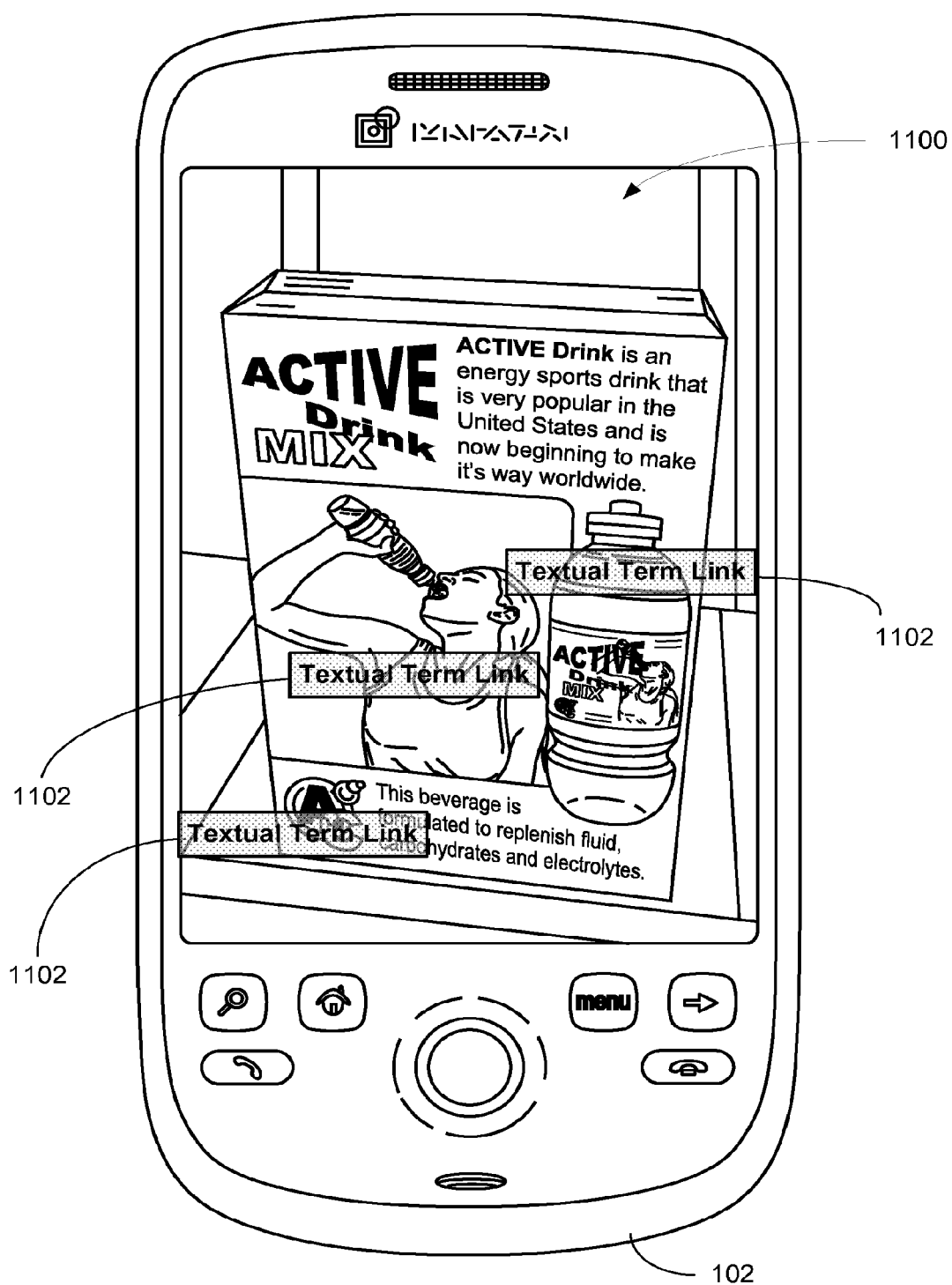
FIG. 11 illustrates a client system with a screen shot of an interactive results document with labels, in accordance with some embodiments.

The results document creation module 326 is used to create an interactive search results document (an example of which is shown in FIG. 11.). The interactive search results document may have one or more detected and searched subjects. The bounding box creation module 328 creates a bounding box around one or more of the searched subjects. The bounding boxes may be rectangular boxes, or may outline the shape(s) of the subject(s). The link creation module 330 creates links to search results associated with their respective subject in the interactive search results document. In some embodiments, the subject searched is associated with one or more textual terms corresponding to an image in a visual query. In some embodiments, clicking within the bounding box area activates the corresponding link inserted by the link creation module.

The query and annotation database 116 contains information that can be used to improve visual query results. In some embodiments, the user may annotate the image after the visual query results have been presented. Furthermore, in some embodiments the user may annotate the image before sending it to the visual query search system. Pre-annotation may help the visual query processing by focusing the results, or running text based searches on the annotated words in parallel with the visual query searches. In some embodiments, annotated versions of a picture can be made public (e.g., when the user has given permission for publication, for example by designating the image and annotation(s) as not private), so as to be returned as a potential image match hit. For example, if a user takes a picture of a flower and annotates the image by giving detailed genus and species information about that flower, the user may want that image to be presented to anyone who performs a visual query research looking for that flower. In some embodiments, the information from the query and annotation database 116 is periodically pushed to the parallel search systems 112, which incorporate relevant portions of the information (if any) into their respective individual databases 114.

Figure 4:
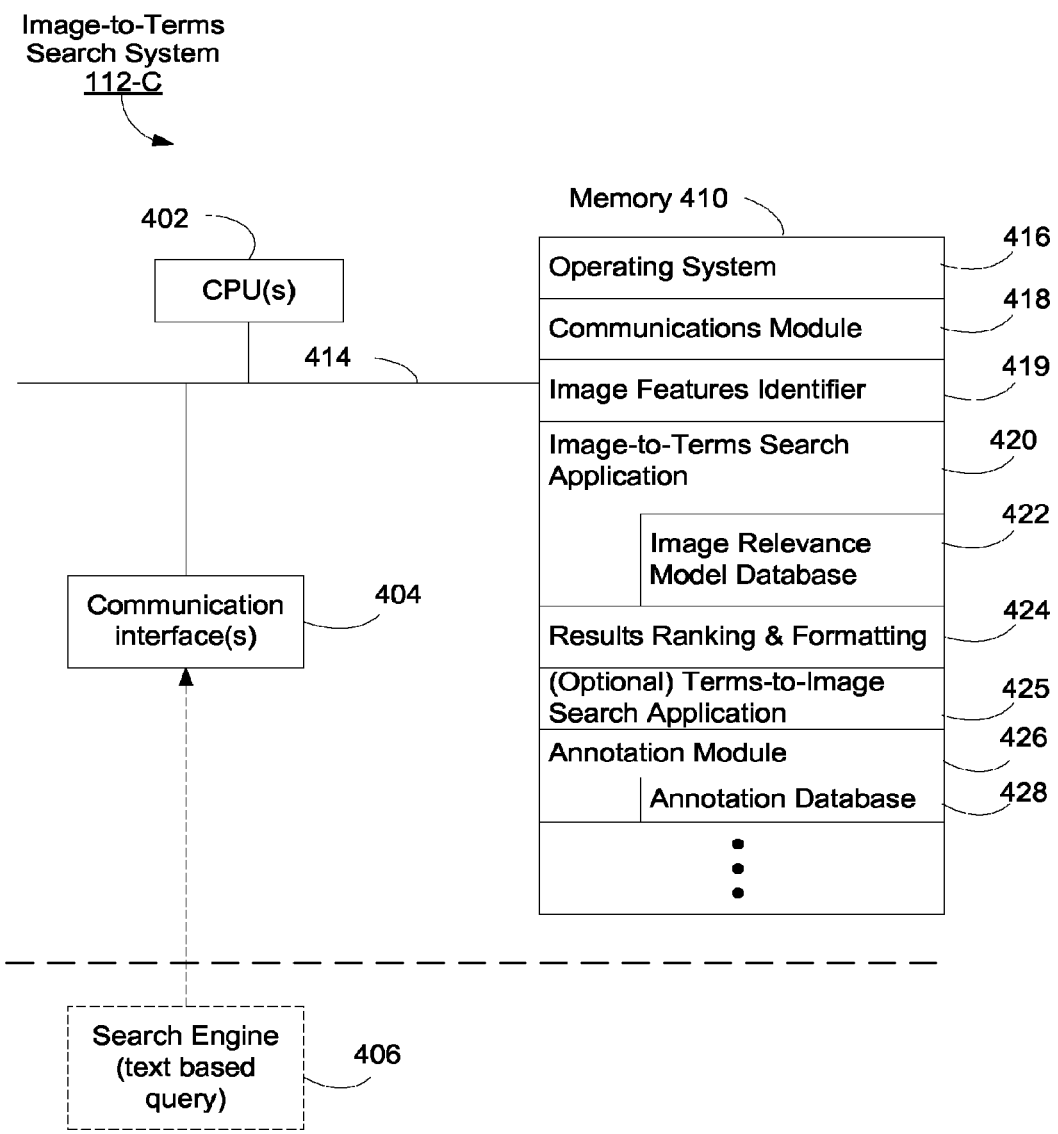
FIG. 4 is a block diagram illustrating an image to terms search system utilized to process a visual query, in accordance with some embodiments.

FIG. 4 is a block diagram illustrating an image-to-terms search system 112-C utilized to process a visual query in accordance with some embodiments. In some embodiments, the image-to-terms search system recognizes objects (instance recognition) in the visual query. In other embodiments, the image-to-terms search system recognizes object categories (type recognition) in the visual query. In some embodiments, the image to terms system recognizes both objects and object-categories. The image-to-terms search system returns potential term matches for images in the visual query. The image-to-terms search system 112-C typically includes one or more processing units (CPU's) 402, one or more network or other communications interfaces 404, memory 412, and one or more communication buses 414 for interconnecting these components. The communication buses 414 optionally include circuitry (sometimes called a chipset) that interconnects and controls communications between system components. Memory 412 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, comprises a non-transitory computer readable storage medium. In some embodiments, memory 412 or the computer readable storage medium of memory 412 stores the following programs, modules and data structures, or a subset thereof:

- an operating system 416 that includes procedures for handling various basic system services and for performing hardware dependent tasks;
- a network communication module 418 that is used for connecting the image-to-terms search system 112-C to other computers via the one or more communication network interfaces 404 (wired or wireless) and one or more communication networks, such as the Internet, other wide area networks, local area networks, metropolitan area networks, and so on;
- an image features identifier 419 for extracting image feature values from the visual query and other images;
- a image-to-terms search application 420 that maps image feature values from the visual query to one or more terms using image relevance models from image relevance model database 422;
- an image relevance model database 422 for storing image relevance models for textual queries, and which can be searched by the image-to-terms search application 420 to find terms relevant to a visual query;
- a results ranking and formatting module 424 for ranking terms relevant to a visual query identified in the image-to-terms search application 420;
- a optional terms-to-image search application 425 for searching for images in response to textual queries from text-based query search engine 406 and logging such searches; and
- an annotation module 426 for receiving annotation information from an annotation database (116, FIG. 1) determining if any of the annotation information is relevant to the image-to terms search system 112-C and storing any determined relevant portions of the annotation information into the respective annotation database 428.

FIGS. 2-4 are intended more as functional descriptions of various features present in a set of computer systems than as a structural schematic of the embodiments described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement visual query processing and how features are allocated among them will vary from one implementation to another.

Each of the methods described herein is typically governed by instructions that are stored in a non-transitory computer readable storage medium and that are executed by one or more processors of one or more servers or clients. The above identified modules or programs (i.e., sets of instructions) need not be implemented as separate software programs, procedures or modules, and thus various subsets of these modules may be combined or otherwise re-arranged in various embodiments. Each of the operations shown in FIGS. 5-10 may correspond to instructions stored in a computer memory or non-transitory computer readable storage medium.

Figure 5:
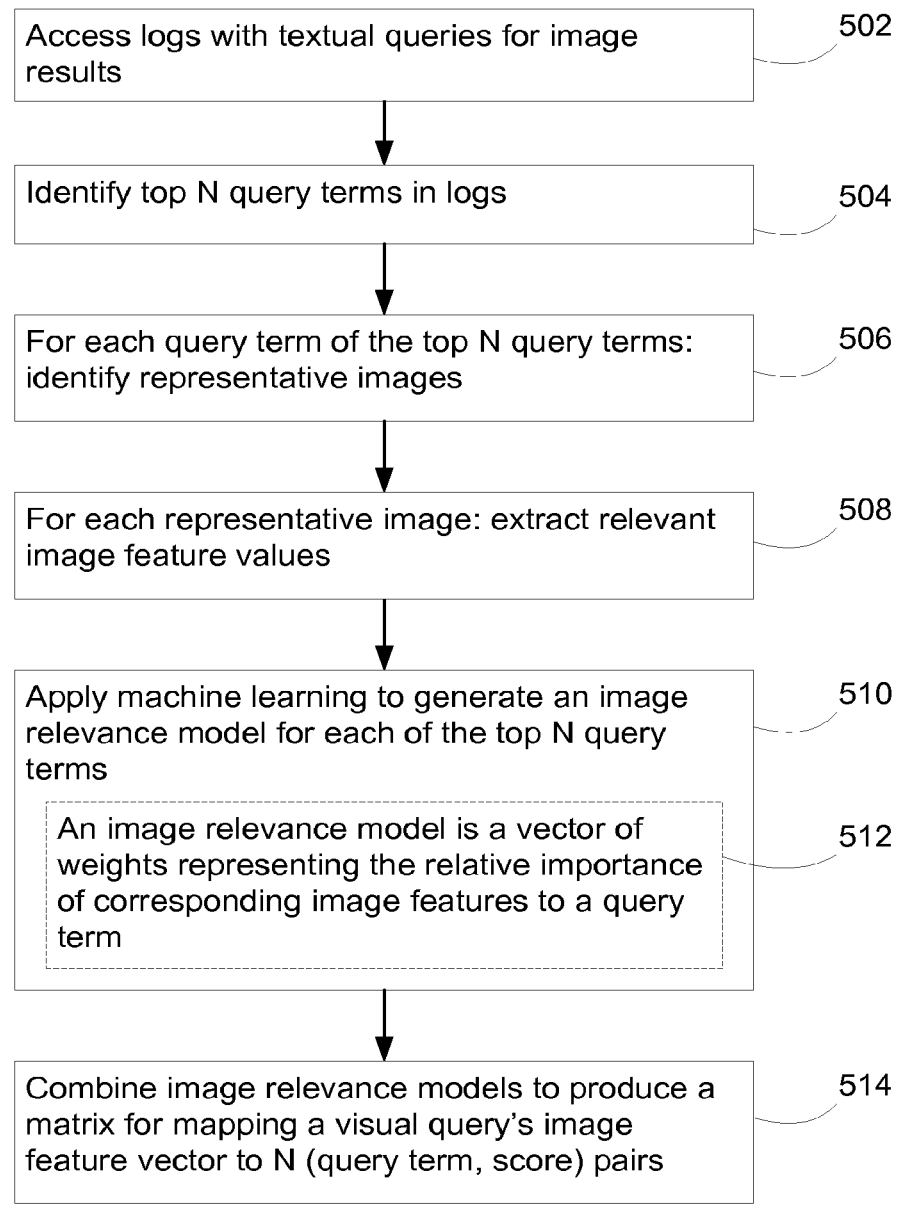
FIG. 5 is a flow diagram illustrating a process for training image relevance models by mapping image features to textual terms, in accordance with some embodiments.

FIG. 5 is a flow diagram illustrating a process for training image relevance models by mapping image features to textual terms, in accordance with some embodiments. Each of the operations shown in FIG. 5 may correspond to instructions stored in a computer memory or computer readable storage medium.

Logs or records of textual queries for image results are accessed (502). Image-to-terms server 112-C accesses logs of textual searches for images (e.g., logs generated by terms-to-image search application 425). The logs include information on the query terms used for image searches, and for each query term, the images that were selected by the users from the search results.

Top N query terms in the logs are identified (504). N unique query terms used in image queries, or N image queries, as documented in the logs accessed in operation 502, are identified, where N is an integer. N is generally greater than 100. In some embodiments, N is an integer in the range of 5,000 to 30,000. In some embodiments, the N query terms are identified based on number of appearances in the logs; the N query terms that are identified are the terms that appear most often in image queries, as documented in the logs, over the span of a defined time period (e.g., three months).

For each query term of the top N query terms, representative images are identified (506). In some embodiments, the representative images for a respective query term are a predefined number of top images (e.g., highest ranked images based on relevance to the query) in search results for a textual search for images using the respective query term as the query. For example, a search for images using the respective query term is performed in the terms-to-image search application 425, and a top subset of the results of the search are identified. In some other embodiments, the representative images are the images that were selected by users most often from search results for image searches using the respective query term, as documented in the logs accessed in operation 502.

For each representative image, relevant image feature values are extracted (508). For example, the image features identifier 419 may extract image feature values for a respective representative image. In some embodiments, an image feature value is a visual characteristic of a portion of the image. Examples of image feature values include color histogram values, intensity values, an edge statistic, texture values, and so forth. Further details on extracting image feature values are disclosed in U.S. patent application Ser. No. 12/505,287, titled "Image Relevance Model," filed Jul. 17, 2009, now U.S. Pat. No. 8,515,212, which is incorporated by reference herein in its entirety.

Machine learning is applied to generate an image relevance model for each of the top N query terms (510). In some embodiments, the image relevance model is a vector of weights representing the relative importance of corresponding image features to a query term (512). For a respective query term, machine learning is applied to the extracted image feature values of the representative images for the respective query term to train (and generate) an image relevance model for the respective query term. In some embodiments, the image relevance model is implemented as a passive-aggressive model for image retrieval (PAMIR), an example of which is disclosed in D. Grangier and S. Bengio, "A Discriminative Kernel-Based Model to Rank Images from Text Queries," IEEE Transactions on Pattern Analysis and Machine Intelligence, vol. 30 (2008), pp. 1371-1384, which is incorporated by reference herein in its entirety as background information. Further details on training and generating the image relevance model is described in U.S. patent application Ser. No. 12/505,287, titled "Image Relevance Model," filed Jul. 17, 2009, now U.S. Pat. No. 8,515,212, which is incorporated by reference above.

Image relevance models for the top N query terms are combined to produce a matrix for mapping a visual query's image feature vector to N (query term, score) pairs (514). Each image relevance model vector for a respective query term becomes a row in a matrix of N rows for mapping a visual query's image feature vector to N (query term, score) pairs.

Figure 6:
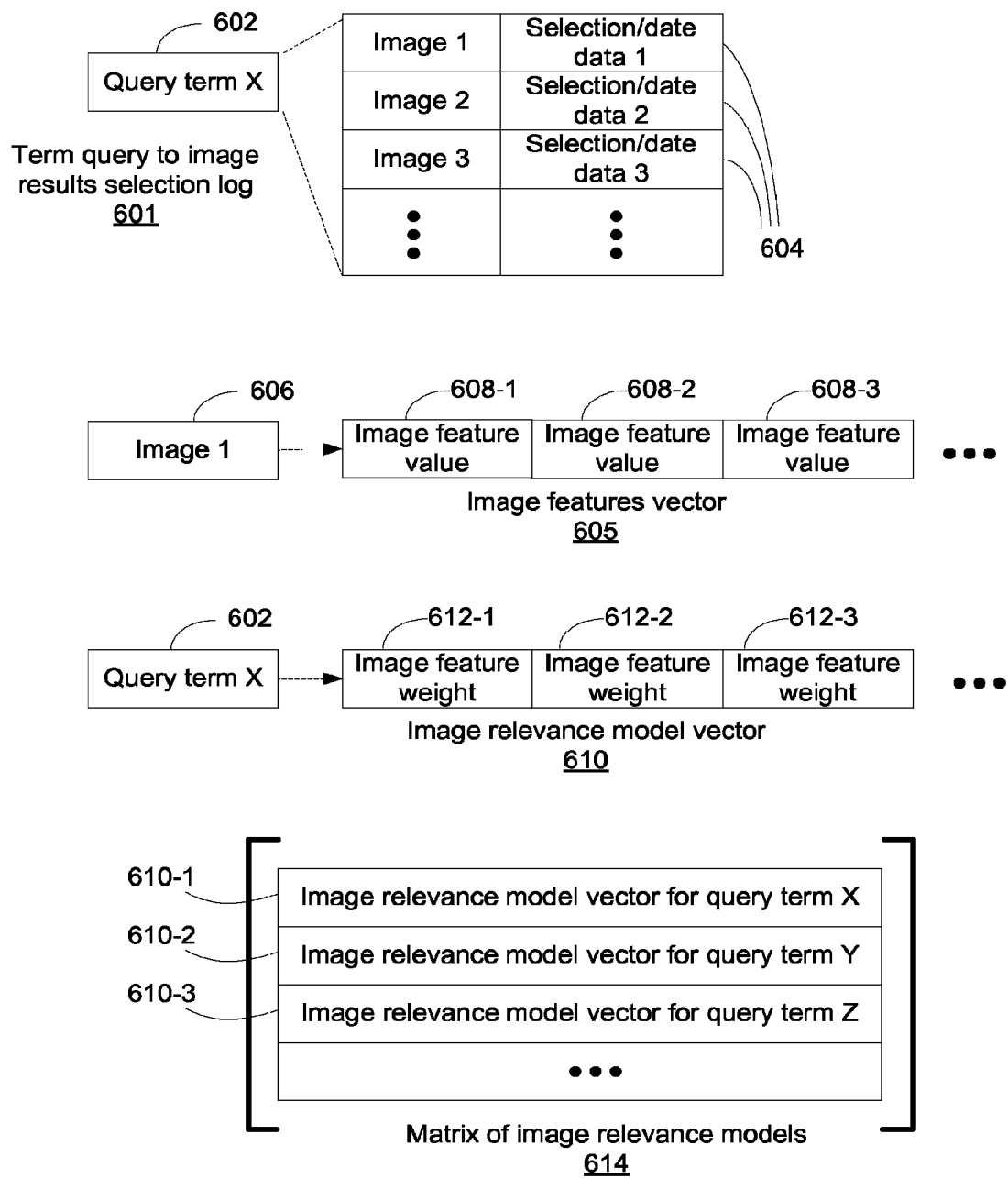
FIG. 6 is a block diagram illustrating exemplary data structures for training image relevance models by mapping image features to textual terms, in accordance with some embodiments.

FIG. 6 is a block diagram illustrating exemplary data structures for training image relevance models by mapping image features to textual terms, in accordance with some embodiments. A log of query terms to image result selections 601 includes, for a query term X 602, one or more records 604 of image search results selected by users for the query term X. A record 604 includes an identifier and location of the image (e.g., the filename and Universal Resource Locator of the image, respectively) and data regarding the date of selection. From the records 604, a number of representative images are identified for query term X 602.

For a representative image, say Image 1 606, the image feature values 608 are extracted/identified and a vector 605 representing the image features is generated.

For Query Term X 602, an image relevance model vector 610 with image feature weights 612 is generated and initialized. The image relevance model vector 610 is trained using the image feature vectors 605 of the representative images for Query Term X 602.

Trained image relevance model vectors 610 for different query terms are combined into a matrix of image relevance models 614. As described below, matrix 614 is used to identify one or more textual terms in response to a visual query.

FIG. 7 is a flow diagram illustrating a process 700 for determining one or more textual terms in response to a visual query, in accordance with some embodiments. Each of the operations shown in FIG. 7 typically corresponds to instructions stored in a computer memory or non-transitory computer readable storage medium.

The visual query server system receives a visual query from a client system (702). The client system, for example, may be a desktop computing device, a mobile device, or another similar device as explained with reference to FIG. 1. An example visual query on an example client system is shown in FIG. 8.

The visual query is an image document of any suitable format. For example, the visual query can be a photograph, a screen shot, a scanned image, or a frame or a sequence of multiple frames of a video. In some embodiments, the visual query is a drawing produced by a content authoring program (236, FIG. 2). As such, in some embodiments, the user "draws" the visual query, while in other embodiments the user scans or photographs the visual query. Some visual queries are created using an image generation application such as ADOBE ACROBAT, a photograph editing program, a drawing program, or an image editing program. For example, a visual query could come from a user taking a photograph of his friend on his mobile phone and then submitting the photograph as the visual query to the server system. The visual query could also come from a user scanning a page of a magazine, or taking a screen shot of a webpage on a desktop computer and then submitting the scan or screen shot as the visual query to the server system. In some embodiments, the visual query is submitted to the server system 106 through a search engine extension of a browser application, through a plug-in for a browser application, or by a search application executed by the client system 102. Visual queries may also be submitted by other application programs (executed by a client system) that support or generate images which can be transmitted to a remotely located server by the client system.

The visual query can be a combination of text and non-text elements. For example, a query could be a scan of a magazine page containing images and text, such as a person standing next to a road sign. A visual query can include an image of a person's face, whether taken by a camera embedded in the client system or a document scanned by or otherwise received by the client system. A visual query can also be a scan of a document containing only text. The visual query can also be an image of numerous distinct subjects, such as several birds in a forest, a person and an object (e.g., car, park bench, etc.), a person and an animal (e.g., pet, farm animal, butterfly, etc.). Visual queries may have two or more distinct elements. For example, a visual query could include a barcode and an image of a product or product name on a product package. For example, the visual query could be a picture of a book cover that includes the title of the book, cover art, and a bar code. In some instances, one visual query will produce two or more distinct search results corresponding to different portions of the visual query, as discussed in more detail below.

The visual query server system responds to the visual query by generating a set of image feature values for the visual query (704). The visual query server system identifies a set of image features in the visual query and generates a set of values for the image features in the visual query. Each image feature value represents a distinct image characteristic of the visual query. Examples of the generation image feature values are described in U.S. patent application Ser. No. 12/505, 287, titled "Image Relevance Model," filed Jul. 17, 2009, now U.S. Pat. No. 8,515,212, which is incorporated by reference above. In some embodiments, the set of image feature values includes color histogram values, intensity values, and an edge statistic (706). Other examples of image feature values include texture and other characteristics of a portion of an image. In some embodiments, the set of image feature values includes more feature values or less feature values than as described above.

The visual query server system maps the set of image feature values to a plurality of textual terms, including a weight for each of the textual terms in the plurality of textual terms (708). In some embodiments, the plurality of textual terms is the top N query terms or top N image queries described above with reference to FIG. 5. A respective textual term is a phrase, multiple words, or a single word. The mapping yields a weight or score for each of the plurality of textual terms with respect to the visual query. The weight or score is a relevance measure of the visual query to a respective textual term.

In some embodiments, the mapping utilizes a set of image relevance models, each model corresponding to a predefined textual term (710). The image relevance model for a textual term is a vector of weights representing the relative importance of a corresponding image feature used in determining whether an image is relevant to the textual term. In some embodiments, the predefined textual terms are the top N query terms, and each model in the set of image relevance models correspond to a respective top N query term.

In some embodiments, the set of image feature values for the visual query comprises an image features vector of the image feature values; and the mapping includes multiplying the image features vector by a matrix of image relevance models, each row of the matrix corresponding to a predefined textual term (712). Stated another way, the set of image feature values is represented by a vector of the values, and the image feature values vector is multiplied with a matrix of image relevance models, where each row in the matrix is a image relevance model vector corresponding to a query term, an example of which is described above with reference to FIGS. 5-6. The resulting product is a set of weights or scores for each of the plurality of textual terms with respect to the visual query.

The visual query server system ranks the textual terms in accordance with the weights of the textual terms (714). For example, the textual terms are ordered by their weights.

The visual query server system sends one or more of the ranked textual terms to the client system in accordance with the ranking the textual terms (716). In some embodiments, the textual terms that are weighted or scored the highest with respect to the visual query, in accordance with the weights or scores calculated from the mapping described above, are sent to the client system for display to the user, an example of which is described below.

In some embodiments, the visual query server system sends to the client system one or more images associated with the ranked textual terms (718) that are sent to the client system. Stated another way, the visual query server system sends, along with the ranked terms, images associated with the ranked terms to the client system. In some implementations, at the client system, a textual term is displayed with an associated image received from the visual query server system. An example of the resulting display at the client system is described below with reference to FIG. 10.

In some cases, one or more of the images associated with the ranked textual terms have image feature values similar to the image feature values identified for the visual query (720). For example, images associated with a ranked textual term are identified from a search for images using the ranked textual term (e.g., using terms-to-image search application 425). A set of best images associated with the ranked textual terms are selected by the visual query server system in accordance with a metric of similarity between their image feature values and the image feature values of the visual query. One example of such a metric of similarity is a dot product of the image feature values of candidate images with the image feature values of the visual query. For each top ranked textual term, one or more images having the highest metric of similarity (e.g., dot product) is selected.

In some embodiments, in response to user selection of a term of the ranked textual terms, a textual query search on the selected term is performed (722). For example, a user may click on one of the displayed ranked textual terms, and in response a textual search using the selected textual term as the query term is performed (e.g., by term query server system 118). The returned search results may include web pages, videos, news articles, etc. that satisfy (e.g., that match, or best match) the textual term query.

In some embodiments, the visual query server system sends to the client system an interactive results document that includes one or more visual identifiers of respective sub-portions of the visual query, and also includes, for each visual identifier in at least a subset of the visual identifiers, at least one user selectable link comprising a respective textual term of the ranked textual terms (724). For example, the visual query server system sends to the client the visual query image with visual identifiers of particular sub-regions overlaid on the visual query image. In some implementations, one or more of the visual identifiers is a user selectable link that is displayed as the corresponding textual term. When the user selectable link is selected by the user, a textual search using the selected textual term as the query term is performed in response. An example of an interactive results document with visual identifiers of respective sub-portions of the visual query is described below with reference to FIG. 11.

FIG. 8 illustrates a client system 102 with a screen shot of an exemplary visual query 802, in accordance with some embodiments. The client system 102 shown in FIG. 8 is a mobile device such as a cellular telephone, portable music player, or portable emailing device. The client system 102 includes a display 206 and one or more input means 208 such the buttons shown in this figure. In some embodiments, the display 206 is a touch sensitive display 209. In embodiments having a touch sensitive display 209, soft buttons displayed on the display 209 may optionally replace some or all of the electromechanical buttons 208. Touch sensitive displays are also helpful in interacting with the visual query results as explained in more detail below. The client system 102 also includes an image capture mechanism such as a camera 210.

FIG. 8 illustrates a visual query 802 which is a photograph or video frame of a package on a shelf of a store. In the embodiments described here, the visual query is a two dimensional image having a resolution corresponding to the size of the visual query in pixels in each of two dimensions. The visual query 802 in this example is a two dimensional image of three dimensional objects. The visual query 802 includes background elements, a product package 804, and a variety of types of entities on the package including an image of a person 806, an image of a trademark 808, an image of a product 810, and a variety of textual elements 812.

As explained with reference to FIG. 7, the visual query 802 is sent to the front end server 110, which sends the visual query 802 to a plurality of parallel search systems (112A-N), receives the results, and creates an interactive results document.

Figure 9:
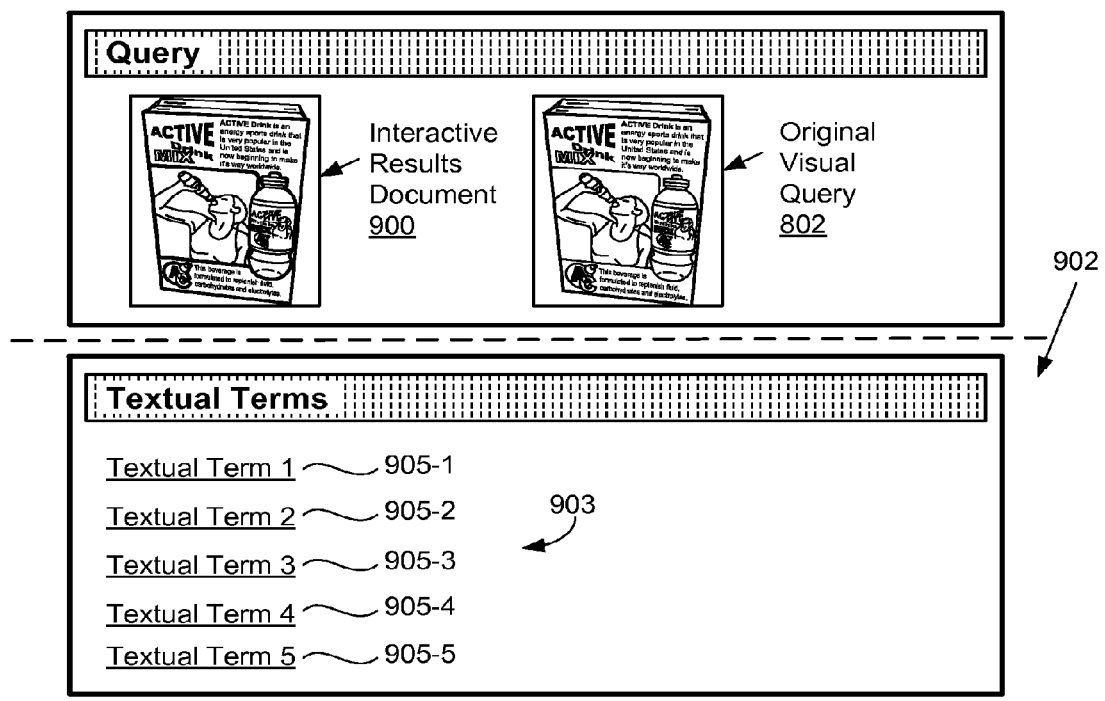
FIG. 9 illustrates a screen shot of an interactive results document and visual query displayed concurrently with a list of textual terms, in accordance with some embodiments.

FIG. 9 illustrates a screen shot of an interactive results document and visual query displayed concurrently with a list of textual terms, in accordance with some embodiments. The screen shot in FIG. 9 shows an interactive results document 900 and the original visual query 802 displayed concurrently with a visual query results list 902. In some embodiments, the interactive results document 900 is displayed by itself. In some other embodiments, the interactive results document 900 is displayed concurrently with the original visual query as shown in FIG. 9. In some embodiments, the list of visual query results 902 is concurrently displayed along with the original visual query 802 and/or the interactive results document 900. The type of client system and the amount of room on the display 206 may determine whether the list of results 902 is displayed concurrently with the interactive results document 900. In some embodiments, the client system 102 receives (in response to a visual query submitted to the visual query server system) both the list of results 902 and the interactive results document 900, but only displays the list of results 902 when the user scrolls below the interactive results document 900.

In FIG. 9, the list of results 902 includes a list of textual terms 903. The list of textual terms 903 includes one or more textual term results 905. The textual terms 905 are terms that were identified for the visual query 802 in accordance with the process described above with reference to FIGS. 7A-7B. Selection of a textual term 905 by the user (e.g., by clicking on the term) activates a textual search using the selected textual term 905 as the query.

In some embodiments, the list of results 902 also includes other search results found in response to the visual query. Examples of search results displayed in response to a visual query are disclosed in U.S. patent application Ser. No. 12/852,189, filed Aug. 6, 2010, entitled "Identifying Matching Canonical Documents in Response to a Visual Query," which is incorporated by reference in its entirety.

Figure 10:
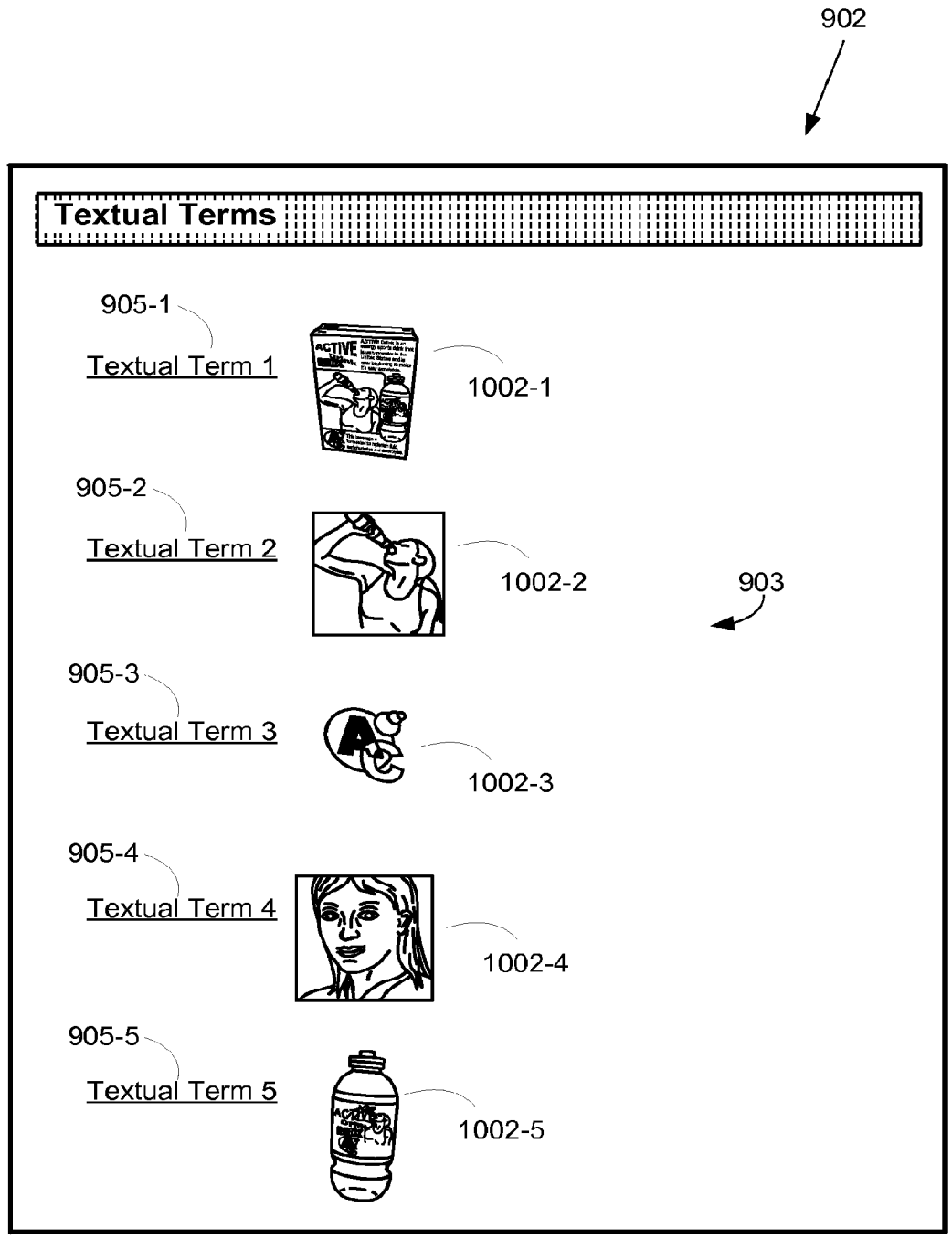
FIG. 10 illustrates a screen shot of a list of textual terms displayed concurrently with corresponding images, in accordance with some embodiments.

In some embodiments, one or more of the textual terms 905 in textual terms list 903 are displayed with one or more accompanying images 1002, as shown in FIG. 10. In some implementations, image 1002 is the most relevant image corresponding to textual term 905, based on an image search using the textual term as the query. The images 1002 are images associated with the visual query 802 as a whole or with sub-portions of the visual query 802. The pairing of textual terms 905 and accompanying images 1002 provide further context to the user as to how the textual terms 905 relate to the visual query 802 and sub-portions of the visual query 802.

FIG. 11 illustrates a client device 102 with a screen shot of an interactive results document 1100 with labels 1102 being the visual identifiers of respective sub-portions of the visual query 802 of FIG. 8, in accordance with some embodiments. The label visual identifiers 1102 each include a textual term associated with the sub-portion. The label visual identifier 1102 also includes a user selectable link (with the textual term as the anchor text) to textual search results using the textual term as the query.

In FIG. 11, the labels 1102 are displayed as partially transparent areas with text that are located over their respective sub-portions of the interactive results document. In some other embodiments, a respective label is positioned near but not located over its respective sub-portion of the interactive results document. In some embodiments, the user activates the display of the textual search results corresponding to a label 1102 by tapping on the activation region inside the space outlined by the edges or periphery of the label 1102.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
   receiving a query image;
   obtaining a set of image features that are associated with the query image;
   obtaining one or more image feature values for the set of image features;
   providing one or more of the image feature values to multiple image relevance models that are each associated with a different query term, each image relevance model being trained to output a score that reflects a relevance of a given query image, from which the image feature values were obtained, to the query term associated with the image relevance model;
   obtaining, from each of the multiple image relevance models, the score that reflects the relevance of the query image to the query term associated with the image relevance model;
   selecting a subset of the query terms that are associated with the multiple image relevance models based at least on the scores; and
   providing, for output, one or more of the query terms of the subset of the query terms.

2. The computer-implemented method of claim 1, wherein obtaining the one or more image feature values comprises obtaining a vector of image feature values.

3. The computer-implemented method of claim 2, further comprising:
for each query term, obtaining a weight for the query term by applying the vector of image feature values to a respective image relevance vector for the query term, wherein each component of the image relevance vector indicates a relative importance of each corresponding component in the vector of image feature values in determining whether the query term is relevant,
wherein selecting the subset of the query terms is based on the respective weight for each query term.

4. The computer-implemented method of claim 3, further comprising mapping the vector of image feature values to one or more query term and weight pairs.

5. The computer-implemented method of claim 2, further comprising, for each query term, applying the vector of image features values to a respective image relevance model, the respective image relevance model including the respective image relevance vector.

6. The computer-implemented method of claim 2, further comprising:
identifying a matrix of image relevance vectors; and
multiplying the vector of image features values by the matrix of image relevance vectors, wherein each row of the matrix of image relevance vectors corresponds to a respective query term of the set of query terms.

7. The computer-implemented method of claim 6, further comprising mapping each vector of image feature values to a respective query term and weight pair.

8. The computer-implemented method of claim 6, further comprising, for each query term, obtaining the weight for the query term based on multiplying the vector of image features values by the matrix of image relevance vectors.

9. The computer-implemented method of claim 8, further comprising ranking each query term of the subset of the query terms based on the respective weight.

10. A system comprising:
one or more computers and one or more storage devices storing instructions that are configured to, when executed by the one or more computers, to cause the one or more computers to perform operations comprising:
receiving a query image;
obtaining a set of image features that are associated with the query image;
obtaining one or more image feature values for the set of image features;
providing one or more of the image feature values to multiple image relevance models that are each associated with a different query term, each image relevance model being trained to output a score that reflects a relevance of a given query image, from which the image feature values were obtained, to the query term associated with the image relevance model;
obtaining, from each of the multiple image relevance models, the score that reflects the relevance of the query image to the query term associated with the image relevance model;
selecting a subset of the query terms that are associated with the multiple image relevance models based at least on the scores; and
providing, for output, one or more of the query terms of the subset of the query terms.

11. The system of claim 10, wherein obtaining the one or more image feature values comprises obtaining a vector of image feature values.

12. The system of claim 11, the operations further comprising:
for each query term, obtaining a weight for the query term by applying the vector of image feature values to a respective image relevance vector for the query term, wherein each component of the image relevance vector indicates a relative importance of each corresponding component in the vector of image feature values in determining whether the query term is relevant,
wherein selecting the subset of the query terms is based on the respective weight for each query term.

13. The system of claim 12, the operations further comprising mapping the vector of image feature values to one or more query term and weight pairs.

14. The system of claim 12, the operations further comprising, for each query term, applying the vector of image features values to a respective image relevance model, the respective image relevance model including the respective image relevance vector.

15. The system of claim 12, the operations further comprising:
identifying a matrix of image relevance vectors; and
multiplying the vector of image features values by the matrix of image relevance vectors, wherein each row of the matrix of image relevance vectors corresponds to a respective query term of the set of query terms.

16. The system of claim 15, the operations further comprising mapping each vector of image feature values to a respective query term and weight pair.

17. A non-transitory computer-readable medium storing software comprising instructions executable by one or more computers which, upon such execution, cause the one or more computers to perform operations comprising:
receiving a query image;
obtaining a set of image features that are associated with the query image;
obtaining one or more image feature values for the set of image features;
providing one or more of the image feature values to multiple image relevance models that are each associated with a different query term, each image relevance model being trained to output a score that reflects a relevance of a given query image, from which the image feature values were obtained, to the query term associated with the image relevance model;
obtaining, from each of the multiple image relevance models, the score that reflects the relevance of the query image to the query term associated with the image relevance model;
selecting a subset of the query terms that are associated with the multiple image relevance models based at least on the scores; and
providing, for output, one or more of the query terms of the subset of the query terms.

18. The computer-readable medium of claim 17, wherein obtaining the one or more image feature values comprises obtaining a vector of image feature values.

19. The computer-readable medium of claim 18, the operations further comprising:
for each query term, obtaining a weight for the query term by applying the vector of image feature values to a respective image relevance vector for the query term, wherein each component of the image relevance vector indicates a relative importance of each corresponding component in the vector of image feature values in determining whether the query term is relevant, wherein selecting the subset of the query terms is based on the respective weight for each query term.

20. The computer-readable medium of claim 19, the operations further comprising mapping the vector of image feature values to one or more query term and weight pairs.

\* \* \* \* \*